United States Patent
Blasco et al.

(10) Patent No.: US 9,471,322 B2
(45) Date of Patent: Oct. 18, 2016

(54) EARLY LOOP BUFFER MODE ENTRY UPON NUMBER OF MISPREDICTIONS OF EXIT CONDITION EXCEEDING THRESHOLD

(71) Applicant: Apple Inc., Cupertino, CA (US)

(72) Inventors: Conrado Blasco, Sunnyvale, CA (US); Ian D. Kountanis, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 14/179,204

(22) Filed: Feb. 12, 2014

(65) Prior Publication Data

US 2015/0227374 A1  Aug. 13, 2015

(51) Int. Cl.
  *G06F 9/30* (2006.01)
  *G06F 9/38* (2006.01)
  *G06F 1/32* (2006.01)
  *G06F 9/32* (2006.01)

(52) U.S. Cl.
  CPC ............ *G06F 9/381* (2013.01); *G06F 1/3287* (2013.01); *G06F 9/30058* (2013.01); *G06F 9/30065* (2013.01); *G06F 9/325* (2013.01); *G06F 9/3806* (2013.01); *G06F 9/3844* (2013.01)

(58) Field of Classification Search
  None
  See application file for complete search history.

(56) References Cited

U.S. PATENT DOCUMENTS

| | | |
|---|---|---|
| 5,303,357 A | 4/1994 | Inoue et al. |
| 5,493,566 A | 2/1996 | Ljungberg et al. |
| 5,701,435 A | 12/1997 | Chi |
| 5,809,326 A | 9/1998 | Nogami |
| 5,893,142 A | 4/1999 | Moyer et al. |
| 5,951,679 A | 9/1999 | Anderson et al. |
| 6,052,776 A | 4/2000 | Miki et al. |
| 6,076,159 A | 6/2000 | Fleck et al. |
| 6,269,440 B1 | 7/2001 | Fernando et al. |
| 6,671,799 B1 | 12/2003 | Parthasarathy |
| 6,748,523 B1 | 6/2004 | Singh et al. |
| 6,950,929 B2 | 9/2005 | Chung et al. |
| 6,959,379 B1 | 10/2005 | Wojcieszak et al. |
| 6,963,965 B1 | 11/2005 | Anderson |
| 7,278,013 B2 | 10/2007 | Booth |
| 7,302,557 B1 | 11/2007 | Hwu et al. |

(Continued)

FOREIGN PATENT DOCUMENTS

| | | |
|---|---|---|
| EP | 1107110 A2 | 6/2001 |
| GB | 2375852 A | 11/2002 |

(Continued)

OTHER PUBLICATIONS

International Search Report and Written Opinion in application No. PCT/US2013/043328 mailed Dec. 16, 2013 pp. 1-10.

(Continued)

*Primary Examiner* — Kenneth Kim
(74) *Attorney, Agent, or Firm* — Rory D. Rankin; Meyertons, Hood, Kivlin, Kowert & Goetzel, P.C.

(57) ABSTRACT

Systems, processors, and methods for determining when to enter loop buffer mode early for loops in an instruction stream. A processor waits until a branch history register has saturated before entering loop buffer mode for a loop if the processor has not yet determined the loop has an unpredictable exit. However, if the loop has an unpredictable exit, then the loop is allowed to enter loop buffer mode early. While in loop buffer mode, the loop is dispatched from a loop buffer, and the front-end of the processor is powered down until the loop terminates.

20 Claims, 7 Drawing Sheets

(56) References Cited

U.S. PATENT DOCUMENTS

| | | | |
|---|---|---|---|
| 7,873,820 | B2 | 1/2011 | Knoth |
| 2002/0178350 | A1 | 11/2002 | Chung et al. |
| 2003/0163679 | A1 | 8/2003 | Ganapathy et al. |
| 2004/0123075 | A1 | 6/2004 | Almog |
| 2004/0193858 | A1 | 9/2004 | Ahmad et al. |
| 2005/0015537 | A1* | 1/2005 | Asaad et al. ............... 711/2 |
| 2006/0095750 | A1 | 5/2006 | Nye et al. |
| 2006/0107028 | A1 | 5/2006 | Meuwissen et al. |
| 2006/0242394 | A1 | 10/2006 | Uchiyama |
| 2007/0113058 | A1 | 5/2007 | Tran et al. |
| 2007/0113059 | A1 | 5/2007 | Tran |
| 2007/0130450 | A1 | 6/2007 | Chiao et al. |
| 2009/0113192 | A1 | 4/2009 | Hall et al. |
| 2009/0217017 | A1* | 8/2009 | Alexander et al. .......... 712/241 |
| 2010/0064106 | A1 | 3/2010 | Yamada et al. |
| 2011/0107071 | A1 | 5/2011 | Jacob (Yaakov) |
| 2011/0252118 | A1 | 10/2011 | Pantos et al. |
| 2011/0298509 | A1 | 12/2011 | Khoury et al. |
| 2012/0079303 | A1 | 3/2012 | Madduri |
| 2012/0185714 | A1 | 7/2012 | Chung et al. |
| 2013/0339699 | A1* | 12/2013 | Blasco-Allue et al. ...... 712/241 |
| 2013/0339700 | A1* | 12/2013 | Blasco-Allue et al. ...... 712/241 |

FOREIGN PATENT DOCUMENTS

| | | |
|---|---|---|
| JP | S63314644 A | 12/1988 |
| JP | H04307624 A | 10/1992 |
| JP | H04307625 A | 10/1992 |
| JP | H0991136 A | 4/1997 |
| JP | H10154098 A | 6/1998 |
| JP | H10177482 A | 6/1998 |
| JP | 2000298587 A | 10/2000 |
| JP | 2001195302 A | 7/2001 |
| JP | 2002516425 A | 6/2002 |
| JP | 2004038601 A | 2/2004 |
| JP | 2010066892 A | 3/2010 |
| TW | I362001 B | 4/2012 |
| WO | WO99/60460 A2 | 11/1999 |
| WO | WO02/37271 A2 | 5/2002 |

OTHER PUBLICATIONS

Extended Search Report in European Application No. 13171667.2, mailed Mar. 27, 2014, pp. 1-5.
Office Action in Japanese Patent Application No. 2013-125334, mailed Aug. 4, 2014, 12 pages.
Notice of Preliminary Rejection in Korean Patent Application No. 10-2013-68355, mailed Aug. 18, 2014, 10 pages.
Final Office Action in Japanese Patent Application No. 2013-125334, mailed Jan. 15, 2015, 10 pages.
Panis, et al., "A Scalable Instruction Buffer and Align Unit for xDSPcore", IEEE Journal of Solid-State Circuits, Jul. 1, 2004, pp. 1094-1100, vol. 39, No. 7, IEEE Service Center, Piscataway, NJ, USA.
Extended Search Report in European Application No. 13170364.7, Oct. 22, 2013, pp. 1-8.
International Search Report and Written Opinion in application No. PCT/US2013/043335 mailed Dec. 13, 2013 pp. 1-12.
Zuluaga, et al. "Introducing Control-Flow Inclusion to Support Pipelining in Custom Instruction Set Extensions", IEEE 7th Symposium on Application Specific Processors. Jul. 28, 2009, 9 pages, http://www1.cs.ucr.edu/faculty/philip/papers/conferences/sasp09/sasp09-ise.pdf. [Retrieved on Dec. 1, 2013].
Office Action in Japanese Patent Application No. 2013-125335, mailed Aug. 4, 2014, 8 pages.
Notice of Preliminary Rejection in Korean Patent Application No. 10-2013-68472, mailed Aug. 18, 2014, 10 pages.
Wu, et al., "Instruction Buffering for Nested Loops in Low-Power Design", IEEE Transactions on Very Large Scale Integration (VLSI) Systems, Jul. 1, 2006, pp. 780-784, vol. 14, No. 7, IEEE Education Activities Department, Piscataway, NJ, USA.
Final Office Action in Japanese Patent Application No. 2013-125335, mailed Jan. 7, 2015, 4 pages.
Office Action in Taiwan Patent Application No. 102121212, mailed Feb. 25, 2015, 15 pages.
Communication pursuant to Article 94(3) EPC in European Application No. 131716672, mailed Mar. 3, 2015, 5 pages.
Non-Final Office Action in U.S. Appl. No. 13/524,478, mailed Mar. 19, 2015, 19 pages.
Non-Final Office Action in U.S. Appl. No. 13/524,508, mailed Apr. 7, 2015, 19 pages.
Notification of the First Office Action in Chinese Application No. 201310353450.4, mailed May 6, 2015, 26 pages.
Final Office Action in U.S. Appl. No. 13/524,478, mailed Jul. 9, 2015, 21 pages.
Notification of the First Office Action in Chinese Application No. 201310233540.X, mailed Jul. 1, 2015, 18 pages.
Office Action in Taiwan Patent Application No. 102121215, mailed Jul. 22, 2015, 12 pages.
Final Office Action in U.S. Appl. No. 13/524,508, mailed Aug. 18, 2015, 18 pages.
Notification of the Second Office Action in Chinese Application No. 201310233540.X, mailed Mar. 4, 2016, 7 pages.
Notification of the Third Office Action in Chinese Application No. 201310233540.X, mailed Jun. 14, 2016, 7 pages.

* cited by examiner

EARLY LOOP BUFFER MODE ENTRY UPON NUMBER OF MISPREDICTIONS OF EXIT CONDITION EXCEEDING THRESHOLD

BACKGROUND

1. Field of the Invention

The present invention relates generally to processors, and in particular to methods and mechanisms for determining when to enter loop buffer mode early for a given loop candidate.

2. Description of the Related Art

Modern day processors are generally structured as multiple stages in a pipelined fashion. Typical pipelines often include separate units for fetching instructions, decoding instructions, mapping instructions, executing instructions, and then writing results to another unit, such as a register. An instruction fetch unit of a microprocessor is responsible for providing a constant stream of instructions to the next stage of the processor pipeline. Typically, fetch units utilize an instruction cache in order to keep the rest of the pipeline continuously supplied with instructions. The fetch unit and instruction cache tend to consume a significant amount of power while performing their required functions. It is a goal of modern microprocessors to reduce power consumption as much as possible, especially for microprocessors that are utilized in battery-powered devices.

In many software applications, the same software steps may be repeated many times to perform a specific function or task. In these situations, the fetch unit will continue to fetch instructions and consume power even though the same loop of instructions is continuously being executed. If the loop could be detected and cached in a loop buffer, then the fetch unit could be shutdown to reduce power consumption while the loop executes.

SUMMARY

Apparatuses, processors and methods for determining when to enter loop buffer mode early for loops with unpredictable exits are disclosed.

In one embodiment, loops may be detected and tracked within an instruction stream being executed by a processor pipeline. The processor pipeline may include at least a loop buffer, loop buffer control unit, and branch prediction unit. The processor may turn off the branch prediction unit when the processor is in loop buffer mode for a given loop. Accordingly, the processor will no longer generate an exit condition prediction for the given loop (e.g., for the loop terminating branch) after entering loop buffer mode. However, it may be the case that the branch prediction mechanism may still be able to make accurate branch predictions for exiting the loop. If the branch prediction is turned off in such cases, and it is assumed the loop will continue iterating, then mispredicts will effectively be introduced. In order to prevent such mispredicts of the loop exit condition for a given loop candidate, the loop buffer control unit may take a conservative approach in determining when to enter loop buffer mode for the given loop candidate. In various embodiments, a determination is made as to when the branch prediction unit is no longer able to effectively predict an exit for the given loop. For example, if a branch history register or other mechanism used to make predictions has saturated or otherwise reached a state in which it may always provide a particular prediction, it may be determined that the predictor is generally no longer useful in the given scenario. As such, when this state is detected loop buffer mode may be entered and it may be deemed reasonable to disable the prediction unit in order to prevent the introduction of additional mispredictions In various embodiments, the loop buffer control unit may monitor the exit condition of a given loop over multiple iterations of the loop to determine whether the loop exit condition is unpredictable. When the loop buffer control unit determines the exit condition for the loop to be unpredictable (e.g., has a high confidence that the exit condition is unpredictable), the given loop may be allowed to enter loop buffer mode early rather than waiting for the above described conservative approach to entering loop buffer mode. In one embodiment, the loop buffer control unit may include a table with a plurality of entries for a plurality of loops being tracked. Each entry may include multiple fields, including an armed bit and a confidence indicator, which is initialized to zero. The confidence indicator may be incremented when the exit condition of the corresponding loop is a branch mispredict, and the confidence indicator may be decremented for any other exit condition. When the confidence indicator reaches a certain threshold, then the exit condition for the loop may be determined to be unpredictable. In various embodiments, the armed bit may be set for this entry and the corresponding loop may be allowed to enter loop buffer mode early.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a loop buffer control unit . . . . " Such a claim does not foreclose the processor from including additional components (e.g., a cache, a fetch unit, an execution unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, the terms "first" and "second" loops can be used to refer to any two loops.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
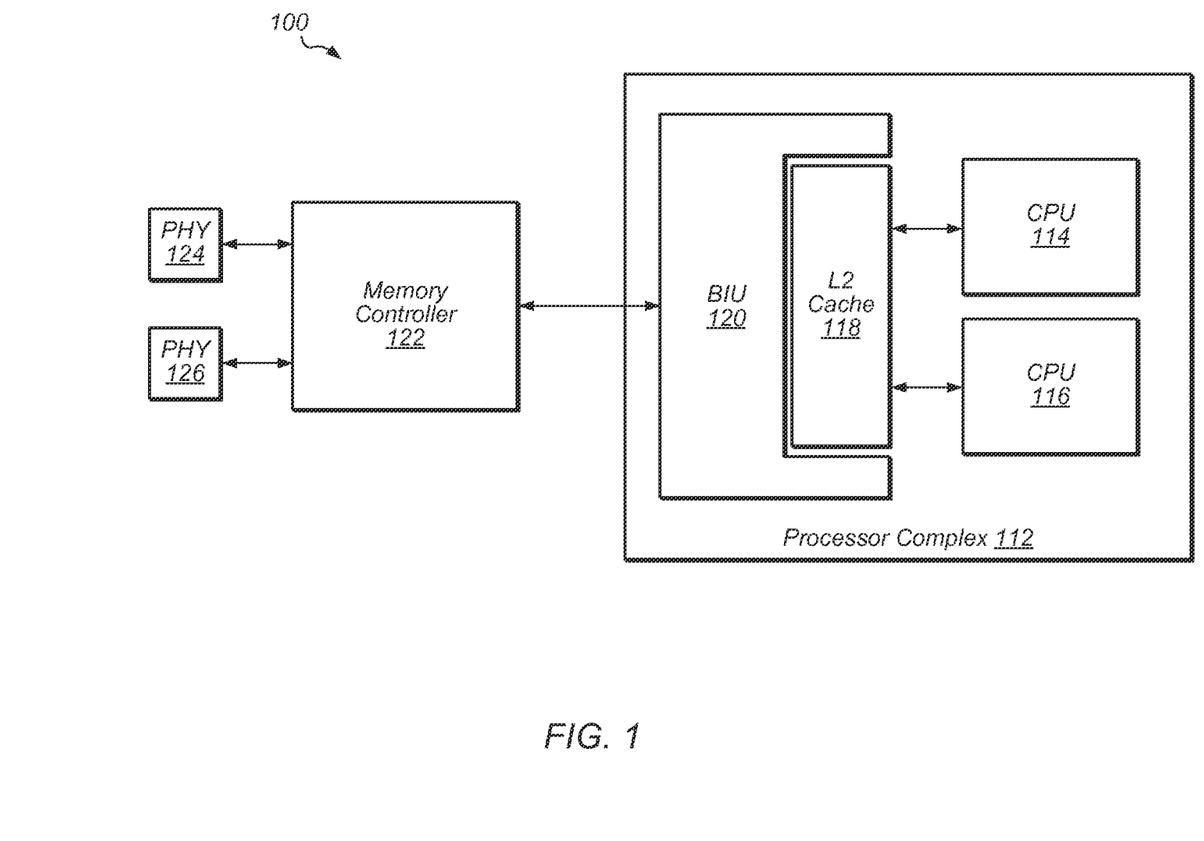
FIG. 1 illustrates one embodiment of a portion of an integrated circuit.

Referring now to FIG. 1, a block diagram illustrating one embodiment of a portion of an integrated circuit (IC) is shown. In the illustrated embodiment, IC 100 includes a processor complex 112, memory controller 122, and memory physical interface circuits (PHYs) 124 and 126. It is noted that IC 100 may also include many other components not shown in FIG. 1. In various embodiments, IC 100 may also be referred to as a system on chip (SoC), an application specific integrated circuit (ASIC), or an apparatus.

Processor complex 112 may include central processing units (CPUs) 114 and 116, level two (L2) cache 118, and bus interface unit (BIU) 120. In other embodiments, processor complex 112 may include other numbers of CPUs. CPUs 114 and 116 may also be referred to as processors or cores. It is noted that processor complex 112 may include other components not shown in FIG. 1.

The CPUs 114 and 116 may include circuitry to execute instructions defined in an instruction set architecture. Specifically, one or more programs comprising the instructions may be executed by CPUs 114 and 116. Any instruction set architecture may be implemented in various embodiments. For example, in one embodiment, the ARM™ instruction set architecture (ISA) may be implemented. Other ISA's may include the PowerPC™ instruction set, the MIPS™ instruction set, the SPARC™ instruction set, the x86 instruction set (also referred to as IA-32), the IA-64 instruction set, etc. Other types of ISA's may also be utilized, including custom-designed or proprietary ISA's.

In one embodiment, each instruction executed by CPUs 114 and 116 may be associated with a program counter address (PC) value. Also, one or more architectural registers may be specified within some instructions for reads and writes. These architectural registers may be mapped to actual physical registers by a register rename unit. Furthermore, some instructions (e.g., ARM Thumb instructions) may be broken up into a sequence of instruction operations (or micro-ops), and each instruction operation of the sequence may be referred to by a unique micro-op (or uop) number.

Each of CPUs 114 and 116 may also include a level one (L1) cache (not shown), and each L1 cache may be coupled to L2 cache 118. Other embodiments may include additional levels of cache (e.g., level three (L3) cache). In one embodiment, L2 cache 118 may be configured to cache instructions and data for low latency access by CPUs 114 and 116. The L2 cache 118 may comprise any capacity and configuration (e.g. direct mapped, set associative). L2 cache 118 may be coupled to memory controller 122 via BIU 120. BIU 120 may also include various other logic structures to couple CPUs 114 and 116 and L2 cache 118 to various other devices and blocks.

Memory controller 122 may include any number of memory ports and may include circuitry configured to interface to memory. For example, memory controller 122 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 122 may also be coupled to memory physical interface circuits (PHYs) 124 and 126. Memory PHYs 124 and 126 are representative of any number of memory PHYs which may be coupled to memory controller 122. Memory PHYs 124 and 126 may be configured to interface to memory devices (not shown).

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, embodiments that include only one instance of a given component may be used even if multiple instances are shown.

Figure 2:
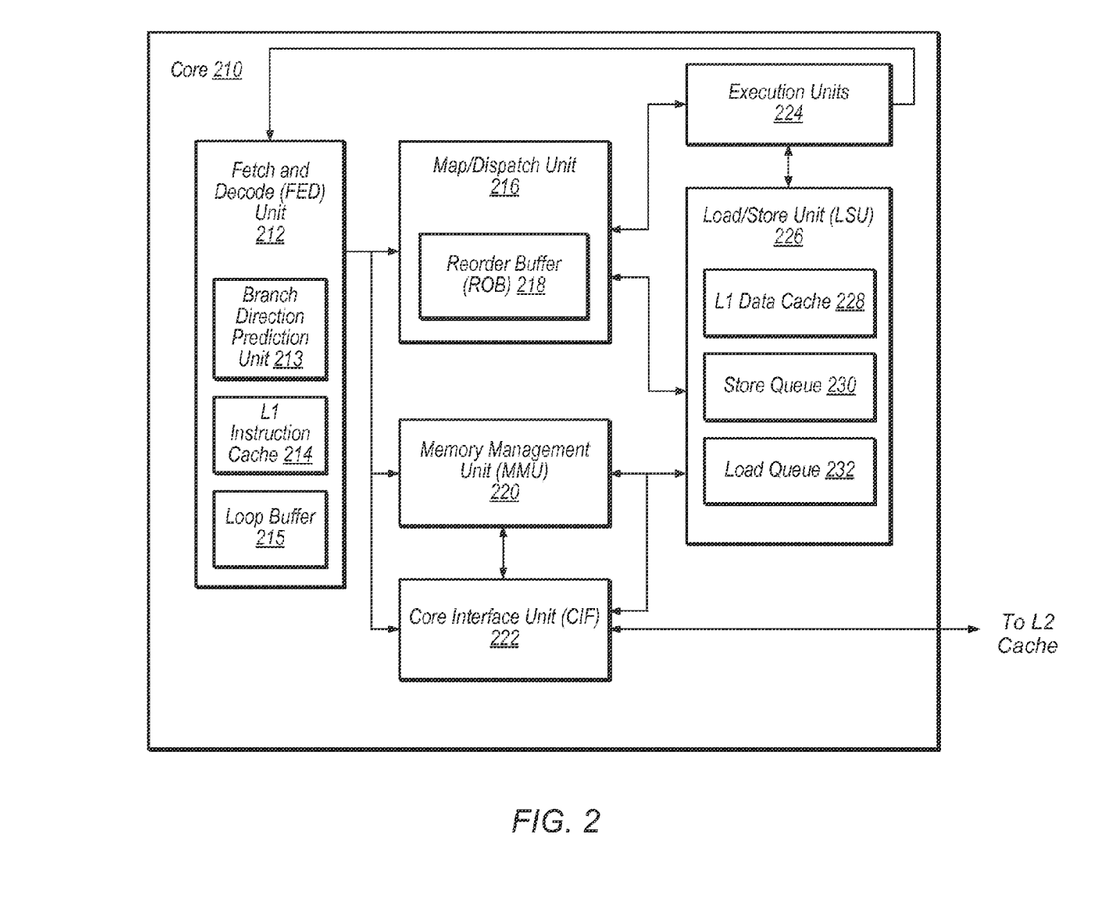
FIG. 2 is a block diagram that illustrates one embodiment of a processor core.

Turning now to FIG. 2, one embodiment of a processor core is shown. Core 210 is one example of a processor core, and core 210 may be utilized within a processor complex, such as processor complex 112 of FIG. 1. In one embodiment, each of CPUs 114 and 116 of FIG. 1 may include the components and functionality of core 210. Core 210 may include fetch and decode (FED) unit 212, map and dispatch unit 216, memory management unit (MMU) 220, core interface unit (CIF) 222, execution units 224, and load-store unit (LSU) 226. It is noted that core 210 may include other components and interfaces not shown in FIG. 2.

FED unit 212 may include circuitry configured to read instructions from memory and place them in level one (L1) instruction cache 214. L1 instruction cache 214 may be a cache memory for storing instructions to be executed by core 210. L1 instruction cache 214 may have any capacity and construction (e.g. direct mapped, set associative, fully associative). Furthermore, L1 instruction cache 214 may have any cache line size. FED unit 212 may also include branch prediction unit 213 configured to predict branch instructions and to fetch down the predicted path. Branch prediction unit 213 is representative of any number of branch predictors and/or other logical units which may be utilized for predicting branch directions, branch targets, return addresses, etc. In one embodiment, branch prediction unit 213 may include a branch history register (not shown) for storing branch history information for a given loop being tracked. In one embodiment, the branch history register may store information about the last N taken branches, wherein N is a predetermined number. For example, in one embodiment, whenever there is a taken branch, a new record corresponding to the branch may be shifted into the branch history register and an old record may be shifted out. When a given loop is being executed, and the branch history register has stored information for N taken branches that have executed over one or more iterations of the given loop, the branch history register can be regarded as being "saturated" for the given loop. Once the branch history register has saturated for the given loop, it may be determined the prediction generated by the branch prediction unit 213 will not change. Consequently, continued generation of branch predictions for the loop may be considered unhelpful and generally unnecessary. It is noted that "saturation" may generally refer to any condition in which a branch prediction unit reaches a state where it will continue to make a given prediction. As noted above, such a state may correspond to N taken branches in a branch history register configured to store a history for N taken branches. In other cases, any repeating pattern within a branch history prediction mechanism that is determined will produce a known prediction may also qualify as saturation. For example, if a history of both taken and not taken branches is stored in a register or other memory device for loop code that is invariant, a repeating pattern will be generated. Once such a pattern fills the capacity of the register or memory device for storing such history information, then saturation may be deemed to have occurred. It is noted that branch prediction unit 213 may also be referred to as a "prediction unit". FED unit 212 may also be redirected (e.g. via misprediction, exception, interrupt, flush, etc.). It is also noted that while the term branch history "register" is used herein, the term register is intended to include any memory device configured to store data.

FED unit 212 may also include loop buffer 215 for storing the instructions of a given repeating loop after it is determined that the given loop meets the criteria for entering loop buffer mode. Core 210 may enter loop buffer mode when a qualifying, repeating loop is detected, causing the loop to be stored in loop buffer 215 and for instructions to be fed out of loop buffer 215 to the rest of the pipeline. While core 210 is in loop buffer mode, L1 instruction cache 214, branch prediction unit 213, and other logic in FED unit 212 may be placed in a low power state in order to save power. Accordingly, since branch prediction unit 213 is shut down once core 210 enters loop buffer mode, core 210 may typically wait until a branch history register has saturated before entering loop buffer mode for a given loop so as to avoid introducing a misprediction. However, if core 210 determines that a given loop has an unpredictable exit, the given loop may enter loop buffer mode early rather than waiting for the branch history register to saturate. Therefore, loops with unpredictable exits will be able to spend more time in loop buffer mode.

FED unit 212 may be configured to decode instructions into instruction operations. In addition, FED unit 212 may also be configured to decode multiple instructions in parallel. Generally, an instruction operation may be an operation that the hardware included in execution units 224 and LSU 226 is capable of executing. Each instruction may translate to one or more instruction operations which, when executed, result in the performance of the operations defined for that instruction according to the ISA. It is noted that the terms "instruction operation" and "uop" may be used interchangeably throughout this disclosure. In other embodiments, the functionality included within FED unit 212 may be split into two or more separate units, such as a fetch unit, a decode unit, and/or other units.

In various ISA's, some instructions may decode into a single uop. FED unit 212 may be configured to identify the type of instruction, source operands, etc., and each decoded instruction operation may comprise the instruction along with some of the decode information. In other embodiments in which each instruction translates to a single uop, each uop may simply be the corresponding instruction or a portion thereof (e.g., the opcode field or fields of the instruction). In some embodiments, the FED unit 212 may include any combination of circuitry and/or microcode for generating uops for instructions. For example, relatively simple uop generations (e.g., one or two uops per instruction) may be handled in hardware while more extensive uop generations (e.g., more than three uops for an instruction) may be handled in microcode.

Decoded uops may be provided to map/dispatch unit 216. Map/dispatch unit 216 may be configured to map uops and architectural registers to physical registers of core 210. Map/dispatch unit 216 may implement register renaming to map source register addresses from the uops to the source operand numbers identifying the renamed source registers. Map/dispatch unit 216 may also be configured to dispatch uops to reservation stations (not shown) within execution units 224 and LSU 226.

In one embodiment, map/dispatch unit 216 may include reorder buffer (ROB) 218. In other embodiments, ROB 218 may be located elsewhere. Prior to being dispatched, the uops may be written to ROB 218. ROB 218 may be configured to hold uops until they can be committed in order. Each uop may be assigned a ROB index (RNUM) corresponding to a specific entry in ROB 218. RNUMs may be used to keep track of the operations in flight in core 210. Map/dispatch unit 216 may also include other components (e.g., mapper array, dispatch unit, dispatch buffer) not shown in FIG. 2. Furthermore, in other embodiments, the functionality included within map/dispatch unit 216 may be split into two or more separate units, such as a map unit, a dispatch unit, and/or other units.

Execution units 224 may include any number and type of execution units (e.g., integer, floating point, vector). Each of execution units 224 may also include one or more reservation stations (not shown). CIF 222 may be coupled to LSU 226, FED unit 212, MMU 220, and an L2 cache (not shown). CIF 222 may be configured to manage the interface between core 210 and the L2 cache. MMU 220 may be configured to perform address translation and memory management functions.

LSU 226 may include L1 data cache 228, store queue 230, and load queue 232. Load and store operations may be dispatched from map/dispatch unit 216 to reservation stations within LSU 226. Store queue 230 may store data corresponding to store operations, and load queue 232 may store data associated with load operations. LSU 226 may also be coupled to the L2 cache via CIF 222. It is noted that LSU 226 may also include other components (e.g., reservation stations, register file, prefetch unit, translation lookaside buffer) not shown in FIG. 2.

It should be understood that the distribution of functionality illustrated in FIG. 2 is not the only possible microarchitecture which may be utilized for a processor core. Other processor cores may include other components, omit one or more of the components shown, and/or include a different arrangement of functionality among the components.

Figure 3:
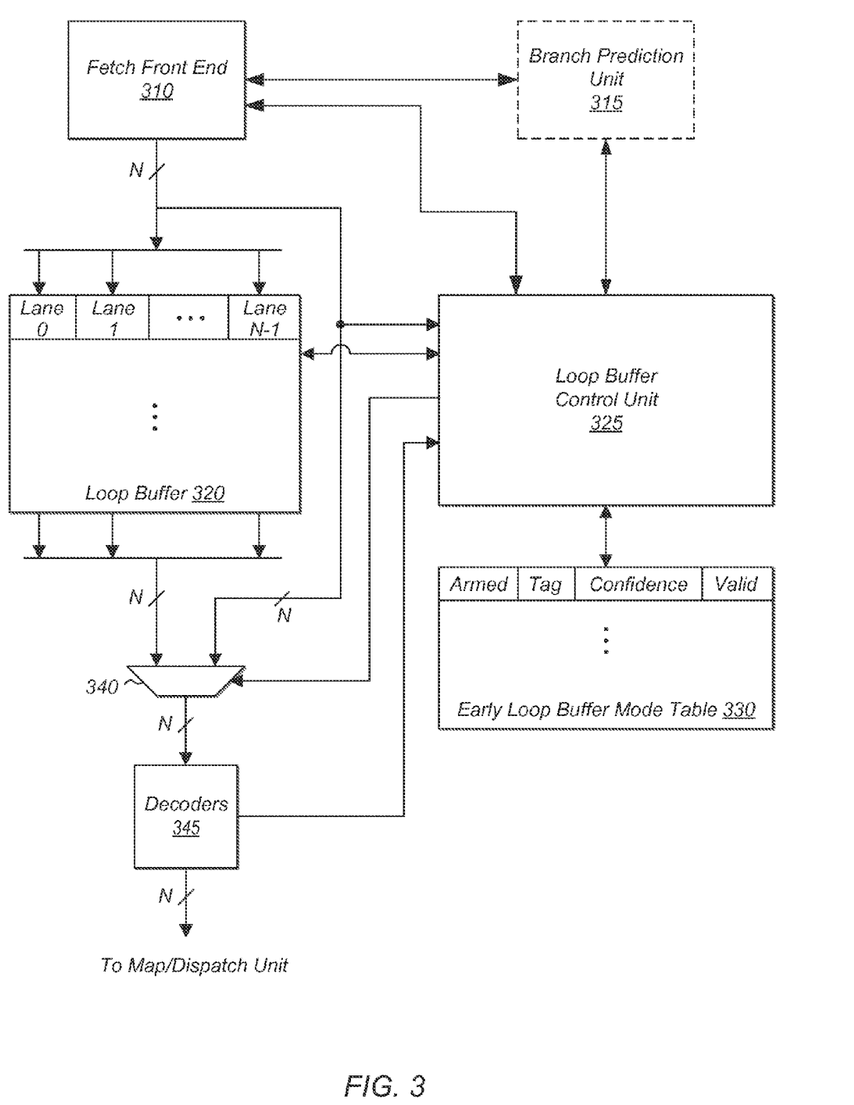
FIG. 3 is a block diagram illustrating one embodiment of a front end of a processor pipeline.

Referring now to FIG. 3, a block diagram of one embodiment of a front end of a processor pipeline is shown. In one embodiment, the front end logic shown in FIG. 3 may be located within a fetch and decode unit, such as FED Unit 212 (of FIG. 2). It should be understood that the distribution of functionality illustrated in FIG. 3 is only one possible structure for implementing a loop buffer within a processor pipeline. Other suitable distributions of logic for implementing a loop buffer are possible and are contemplated.

Fetch front end 310 may be configured to fetch and pre-decode instructions and then convey pre-decoded uops to loop buffer 320 and the decoders 345 (via multiplexer 340). In one embodiment, fetch front end 310 may be configured to output a plurality (or N) pre-decoded uops per cycle.

Loop buffer 320, multiplexer 340, and decoders 345 may have N lanes for processing and/or storing N uops per cycle, wherein 'N' is a positive integer. Each lane may also include a valid bit to indicate if the lane contains a valid uop. Fetch front end 310 may expand instructions into uops, pre-decode the uops, and then feed these pre-decoded uops to loop buffer 320 and multiplexer 340. Each pre-decoded uop may include instruction opcode bits, instruction predecode bits, and a uop number. The instruction opcode bits specify the operation that is to be performed. The predecode bits indicate the number of uops that the instruction maps to. The uop number represents which uop in a multi-uop instruction sequence should be generated. In other embodiments, the instructions may be decoded and formatted in any suitable manner.

When the processor is not in loop buffer mode, then the uops output from fetch front end 310 may be conveyed to decoders 345 via multiplexer 340. A select signal from loop buffer control unit 325 may be coupled to multiplexer 340 to determine which path is coupled through multiplexer 340 to the inputs of decoders 345. When the processor is in loop buffer mode, uops may be read out of loop buffer 320 and conveyed to decoders 345. Uops may be conveyed from the outputs of decoders 345 to the next stage of the processor pipeline. In one embodiment, the next stage of the processor pipeline may be a map/dispatch unit, such as map/dispatch unit 216 of FIG. 2.

Loop buffer control unit 325 may be configured to identify a loop within the fetched and pre-decoded instructions. Once a loop has been identified with some degree of certainty and meets the criteria for entering loop buffer mode, the loop may be cached in loop buffer 320, fetch front end 310 and branch prediction unit 315 may be shutdown, and then the rest of the processor pipeline may be fed from loop buffer 320. In one embodiment, one iteration of the loop may be cached in loop buffer 320, and this cached iteration may be repeatedly dispatched down the pipeline. In another embodiment, multiple iterations of the loop may be cached in loop buffer 320.

To identify a loop for caching, first a backwards taken branch may be detected among the fetched instructions. A "backwards taken branch" may be defined as a taken branch that branches to a previous instruction in the instruction sequence. The instruction to which the backwards taken branch goes to may be considered the start of the loop. In one embodiment, only certain types of loops may be considered as candidates for buffering. For example, in one embodiment, for a loop candidate to be considered for buffering, all of the iterations of the loop have to be invariant. In other words, the loop candidate executes the same instruction sequence on each iteration. Additionally, a loop candidate may need to meet a size requirement so that it can fit in the loop buffer 320. Furthermore, loops with indirect taken branches (e.g., BX—branch exchange, BLX—branch with link exchange) in the instruction sequence of the loop may be excluded from consideration for buffering. Still further, only one backwards taken branch per loop may be permitted. The rest of the branches in the loop should be forward branches. In other embodiments, all types of loops may be considered, such that all types of loops may be loop candidates, while the only criteria that may be enforced may be invariance of the loop. For example, more than one backwards taken branch may be allowed in a loop candidate, such as in a nested loop.

Loop buffer control unit 325 may monitor the instruction stream for instructions that form loops that meet the criteria for loop buffering. Loop buffer control unit 325 may capture all of the information of what a given loop candidate looks like. For a certain amount of time, the loop candidate may be tracked over multiple iterations to make sure that the loop candidate stays the same. For example, the distances from the start of the loop to one or more instructions within the loop may be recorded on a first iteration and monitored on subsequent iterations to determine if these distances remain the same.

In one embodiment, once the same backwards taken branch has been detected more than once, then a state machine to capture the information for that loop may be started by loop buffer control unit 325. In one embodiment, the decoders 345 may detect a backwards taken branch and signal this to loop buffer control unit 325. In another embodiment, fetch front end 310 may detect a backwards taken branch and convey an indication of the detection to unit 325. Alternatively, in a further embodiment, unit 325 may monitor the instruction stream for backwards taken branches and detect backwards taken branches independently of decoders 345 or fetch front end 310.

After a certain predetermined amount of time, unit 325 may determine that the loop candidate should be cached in loop buffer 320. The length of the predetermined amount of time may be measured in a variety of ways and based on one or more of a variety of factors. For example, in one embodiment, the length of the predetermined amount of time may vary based on whether the loop candidate has an unpredictable exit. If the loop candidate does not have an unpredictable exit, then unit 325 may wait a first amount of time before storing the loop candidate in loop buffer 320 and initiating loop buffer mode. If the loop candidate has an unpredictable exit, then unit 325 may wait a second amount of time before storing the loop candidate in loop buffer 320 and initiating loop buffer mode, wherein the second amount of time is less than the first amount of time. In one embodiment, loop candidates may be categorized into two different types of groups of loop candidates. The first type is for loop candidates for which unit 325 has high confidence that the exit is unpredictable and therefore may enter loop buffer mode early. In this case the first type is determined to have an unpredictable exit condition. The second type is for loop candidates for which unit 325 does not know if the exit is predictable and so unit 325 defaults to conservatively waiting for the branch history to saturate (at which time the exit condition is determined to be unpredictable) before entering loop buffer mode.

The first and second amount of times may be measured in any of a variety of manners depending on the embodiment. For example, in one embodiment, the first and second amounts of time may be measured by a certain number of iterations of the loop. Alternatively, in another embodiment, the amounts of time may be based on a number of taken branches (over one or more iterations of the loop) that have been detected. In this embodiment, the branch history data for a loop candidate for which unit 325 does not know if the exit is predictable may be stored in a register, and when the branch history saturates, the loop candidate may be allowed to enter loop buffer mode. However, for loop candidates with unpredictable exits, these loop candidates may be allowed to enter loop buffer mode before the branch history saturates. For example, in one embodiment, a loop candidate with an unpredictable exit may be allowed to enter loop buffer mode once the loop is recognized by matching its PC to the tag value in an armed entry of table 330. In a further embodiment, the amounts of time may be based on a number of executed instructions over one or more iterations of the loop. In other embodiments, other ways of determining the first and second amount of times may be utilized.

Loop buffer control unit 325 may include or be coupled to early loop buffer mode table 330. Early loop buffer mode table 330 may have any number of entries for tracking any number of loops. Each entry in table 330 may include a plurality of fields, including an armed bit, a tag, a confidence indicator, a valid bit, and any number of other attributes. The tag may be used to identify the loop. In one embodiment, the tag may be the PC of the backwards taken branch of the loop. The valid bit may indicate if the entry is for a valid loop. The confidence indicator may track the confidence with which the exit condition from the loop can be predicted. The confidence indicator may have any number of bits, depending on the embodiment. In one embodiment, each time there is a misprediction for the exit condition of a given loop, the confidence indicator may be increased. Each time the exit condition of the given loop is predicted correctly, the confidence indicator may be decreased. Once the confidence indicator reaches a predetermined threshold, the given loop may be considered as having an unpredictable exit and the armed bit may be set, allowing the loop to enter loop buffer mode early.

Figure 4:
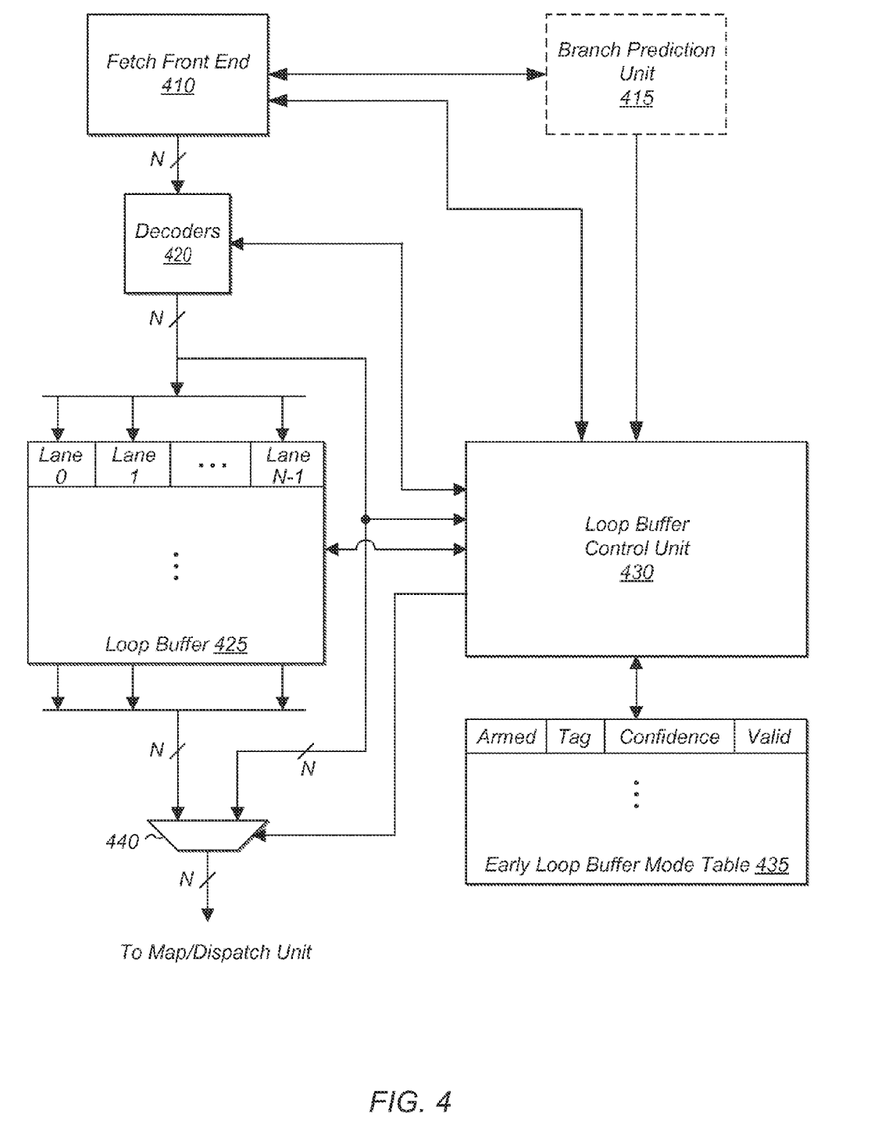
FIG. 4 is a block diagram illustrating another embodiment of a front end of a processor pipeline.

Turning now to FIG. 4, another embodiment of a front end of a processor pipeline is shown. In one embodiment, loop buffer 425 may be located downstream from decoders 420 in the processor pipeline, as shown in FIG. 4. This is in contrast to loop buffer 320 which is located upstream from decoders 345 in the processor front end shown in FIG. 3.

Fetch front-end 410 may fetch instructions and pre-decode the fetched instructions into pre-decoded uops. Then, the pre-decoded uops may be conveyed to decoders 420. Fetch front-end 410 may be configured to generate and convey 'N' pre-decoded uops per cycle to the 'N' lanes of decoders 420, wherein 'N' is any positive integer.

Decoders 420 may decode the pre-decoded uops into decoded uops. Then, decoders 420 may convey the decoded uops to the next stage of the processor pipeline via multiplexer 440. Also, decoders 420 may convey uops to loop buffer 425 when a loop candidate has been identified and has met the criteria for being cached into loop buffer 425. The outputs of multiplexer 440 may be coupled to the next stage of the processor pipeline. In one embodiment, the next stage of the processor pipeline may be a map/dispatch unit.

Loop buffer 425, loop buffer control unit 430, and early loop buffer mode table 435 may be configured to perform functions similar to those described in relation to the processor front end shown in FIG. 3. One key difference in FIG. 4 is that loop buffer 425 may store decoded uops as opposed to loop buffer 320 storing pre-decoded uops in FIG. 3. Therefore, loop buffer 425 may be of larger size than loop buffer 320 to accommodate the larger amount of data, since decoded uops typically have more information than pre-decoded uops. It is noted that loop buffer 425 may also be located at other locations within a processor pipeline, in addition to the two locations shown in FIGS. 3 and 4. For example, loop buffer 425 may be located within a fetch front end, or alternatively, loop buffer 425 may be located within a map/dispatch unit. Depending on where the loop buffer is located in the pipeline, the contents of the loop that are stored in the loop buffer may vary based on the amount of instruction processing that has been performed at that point in the pipeline.

For certain types of loops, the branch prediction unit 415 may not be able to accurately predict the loop exit condition. For example, inner-outer loops (e.g., double for loops), where an inner loop executes and then falls through to an outer loop which then comes back to execute the inner loop again. For these loops, waiting until the branch history saturates decreases the percentage of time that the loop buffer 425 is utilized. Therefore, entering loop buffer mode early allows loops with unpredictable exits to spend more time in loop buffer mode.

Figure 5:
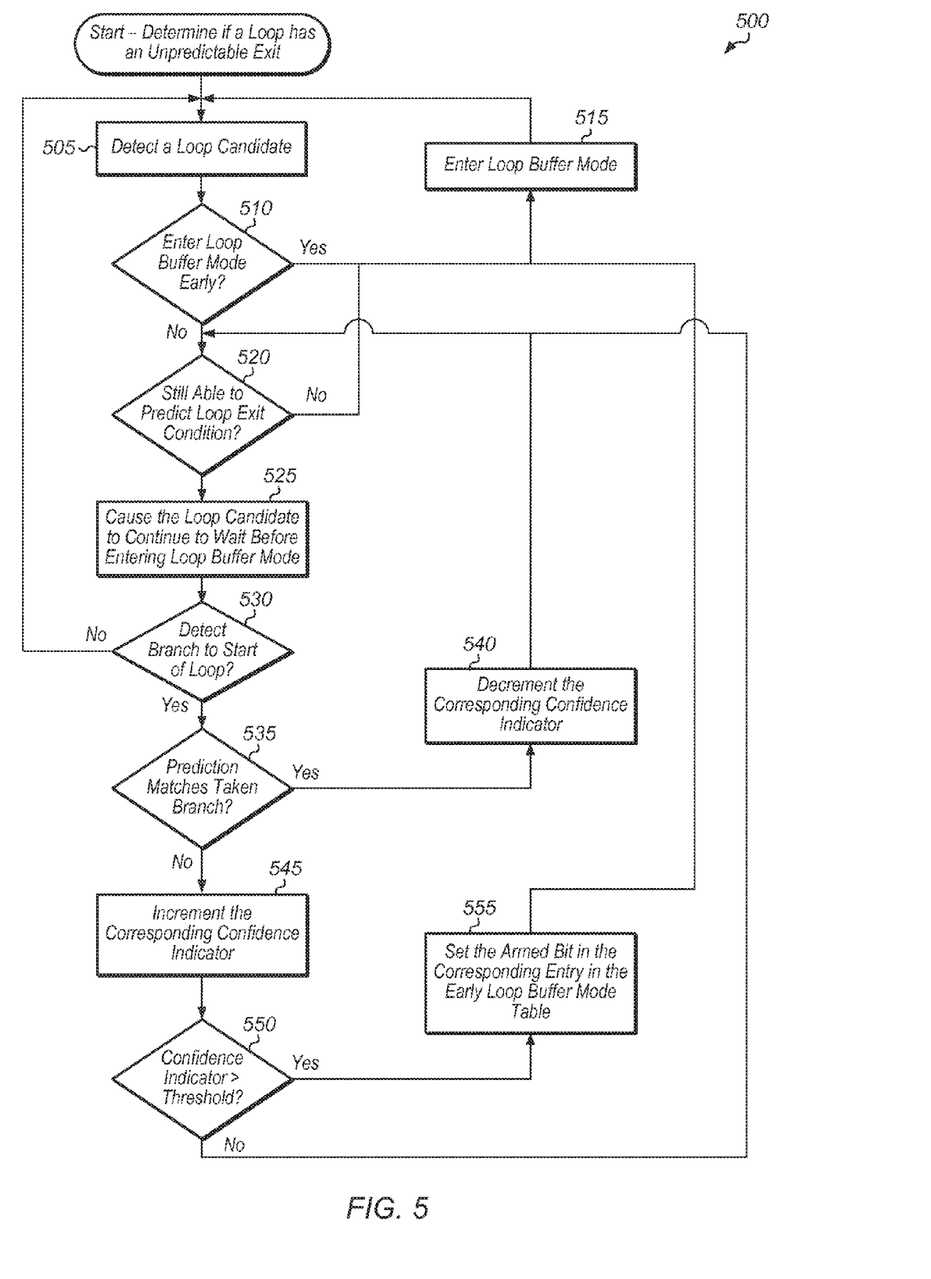
FIG. 5 is a generalized flow diagram illustrating one embodiment of a method for determining if a loop candidate has an unpredictable exit.

Referring now to FIG. 5, one embodiment of a method 500 for determining if a loop has an unpredictable exit is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Blocks may be performed in parallel in combinatorial logic circuitry in any of the loop buffer control units and/or processor front ends described herein. Blocks, combinations of blocks, and/or the flowchart as a whole may be pipelined over multiple clock cycles.

A loop candidate may be detected in an instruction stream (block 505). It may be assumed for the purposes of this discussion that the loop candidate meets the criteria (e.g., invariance) for going into loop buffer mode. After detecting the loop candidate, the loop buffer control unit may determine if the conditions for entering loop buffer mode early are met (conditional block 510). In one embodiment, the loop buffer control unit may determine if the conditions for entering loop buffer mode early are met by checking if an entry corresponding to the detected loop candidate in the early loop buffer mode table is armed. The early loop buffer mode table may include any number of entries for any number of loops being tracked. Each entry of the early loop buffer mode table may include a plurality of fields, including an armed bit, a valid bit, a confidence indicator, a signature of the loop, and/or other attributes. A new entry may be created the first time a loop candidate is detected and the armed bit of the new entry may be initialized to zero to indicate the entry is unarmed at initialization.

If the conditions for entering loop buffer mode early are met (conditional block 510, "yes" leg), then the loop candidate may enter loop buffer mode early (block 515). After block 515, method 500 may return to block 505 to wait for another loop candidate to be detected.

If the conditions for entering loop buffer mode early are not met (conditional block 510, "no" leg), the loop buffer control unit may determine if the branch prediction unit is still able to predict the loop exit condition (conditional block 520). In one embodiment, the branch prediction unit is still able to predict the loop exit condition if the branch history register has not yet saturated. For example, in an embodiment where a branch history register is updated only with taken branches, once N taken branches have been detected in a register configured to store a history for N branches, the register has saturated, loop buffer mode is entered, and the branch prediction mechanism may be turned off. In other embodiments, the branch history register may be updated with taken and/or not taken branches, and the branch history register may be saturated by any repeating pattern of taken and/or not taken branches.

If the branch prediction unit is still able to predict the loop exit condition (conditional block 520, "yes" leg), then the loop buffer control unit may cause the loop candidate to continue to wait before entering loop buffer mode (block 525). If the branch prediction unit is no longer able to predict the loop exit condition (conditional block 520, "no" leg), then the loop buffer control unit may cause the loop candidate to enter loop buffer mode (block 515). After block 525, the loop buffer control unit may detect that the loop candidate has branched from the backwards taken branch to the start of the loop, which initiates another iteration of the loop candidate (conditional block 530, "yes" leg). In response to detecting the new iteration of the loop candidate, the loop buffer control unit may determine if the branch prediction mechanism correctly predicted that the backwards taken branch was taken (conditional block 535). If the backwards taken branch is not taken (conditional block 530, "no" leg), then method 500 may return to block 505 and wait to detect another loop candidate.

If the prediction matched the taken outcome of the backwards taken branch (conditional block 535, "yes" leg), then the confidence indicator in the corresponding entry in the early loop buffer mode table may be decremented (block 540). After block 540, method 500 may return to conditional block 520 to determine if the branch prediction unit is still able to predict the loop exit condition. If the prediction does not match the taken outcome of the backwards taken branch (conditional block 535, "no" leg), then the confidence indicator in the corresponding entry in the early loop buffer mode table may be incremented (block 545).

Next, the confidence indicator may be compared to a predetermined threshold (conditional block 550). If the confidence indicator is greater than the predetermined threshold (conditional block 550, "yes" leg), then the armed bit may be set for the corresponding entry in the early loop buffer mode table (block 555). By setting the armed bit for this loop, the loop buffer control unit is designating the loop as having an unpredictable exit. After block 555, method 500 may return to block 515 to enter loop buffer mode early. If the confidence indicator is less than or equal to the predetermined threshold (conditional block 550, "no" leg), then the corresponding entry may remain unarmed and method 500 may return to conditional block 520 to determine if the branch prediction unit is still able to predict the loop exit condition. It is noted that it is assumed for the purposes of this discussion that the loop candidate is invariant. If the loop buffer control unit detects that a given loop candidate has changed from one iteration to the next, then method 500 may return to block 505 and wait for another loop candidate to be detected.

Figure 6:
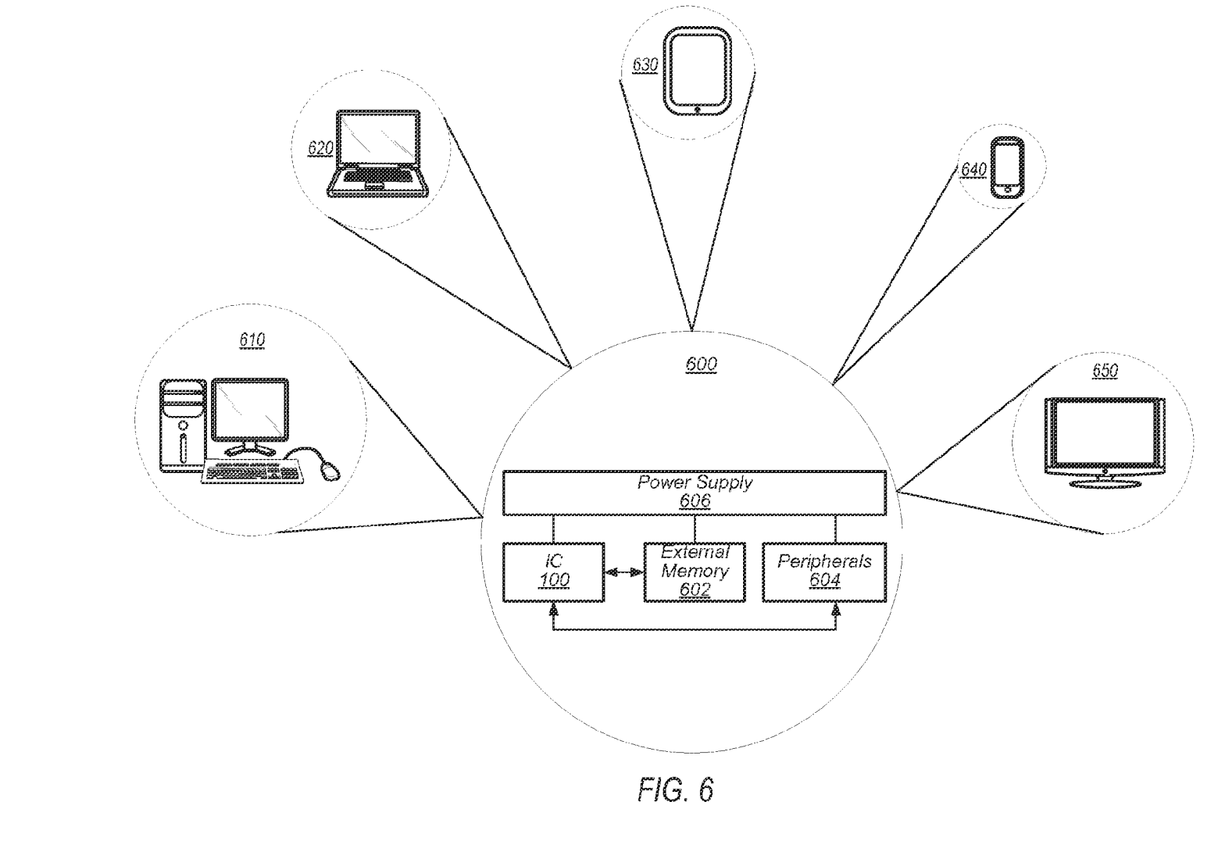
FIG. 6 is a block diagram of one embodiment of a system.

Turning next to FIG. 6, a block diagram of one embodiment of a system 600 is shown. As shown, system 600 may represent chip, circuitry, components, etc., of a desktop computer 610, laptop computer 620, tablet computer 630, cell phone 640, television 650 (or set top box configured to be coupled to a television), or otherwise. In the illustrated embodiment, the system 600 includes at least one instance of IC 100 (of FIG. 1) coupled to an external memory 602.

IC 100 is coupled to one or more peripherals 604 and the external memory 602. A power supply 606 is also provided which supplies the supply voltages to IC 100 as well as one or more supply voltages to the memory 602 and/or the peripherals 604. In various embodiments, power supply 606 may represent a battery (e.g., a rechargeable battery in a smart phone, laptop or tablet computer). In some embodiments, more than one instance of IC 100 may be included (and more than one external memory 602 may be included as well).

The memory 602 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

The peripherals 604 may include any desired circuitry, depending on the type of system 600. For example, in one embodiment, peripherals 604 may include devices for various types of wireless communication, such as wifi, Bluetooth, cellular, global positioning system, etc. The peripherals 604 may also include additional storage, including RAM storage, solid state storage, or disk storage. The peripherals 604 may include user interface devices such as a display screen, including touch display screens or multi-touch display screens, keyboard or other input devices, microphones, speakers, etc.

Figure 7:
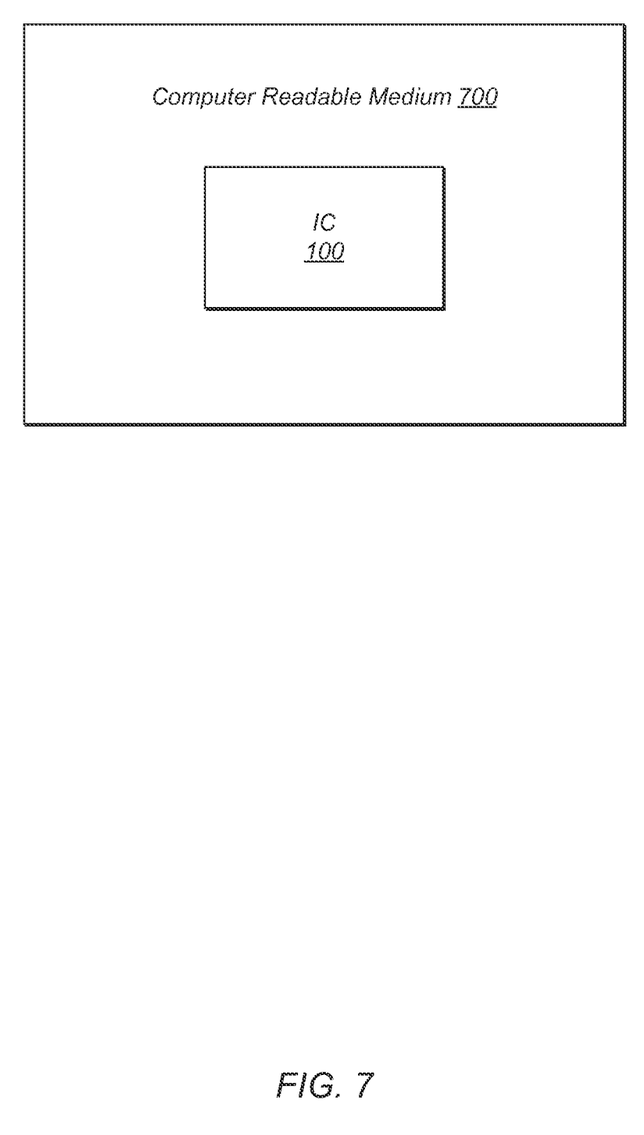
FIG. 7 is a block diagram of one embodiment of a computer readable medium.

Referring now to FIG. 7, one embodiment of a block diagram of a computer readable medium 700 including one or more data structures representative of the circuitry included in IC 100 (of FIG. 1) is shown. Generally speaking, computer readable medium 700 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 700 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 700 may be the netlist(s) (with or without the synthesis library) or the data set(s), as desired. In yet another alternative, the data structures may comprise the output of a schematic program, or netlist(s) or data set(s) derived therefrom.

While computer readable medium 700 includes a representation of IC 100, other embodiments may include a representation of any portion or combination of portions of IC 100 (e.g., loop buffer, loop buffer control unit).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   an instruction cache configured to store instructions;
   a prediction unit configured to predict a loop exit condition;
   a loop buffer configured to store instructions corresponding to one or more loops, wherein responsive to detecting the processor is in a loop buffer mode, instructions are dispatched from the loop buffer rather than the instruction cache,; and
   a loop buffer control unit coupled to the loop buffer, wherein the loop buffer control unit is configured to enter the loop buffer mode for a first loop responsive to determining the first loop has an unpredictable exit, wherein determining the first loop has an unpredictable exit comprises detecting a number of mispredictions of an exit condition for the first loop exceeds a threshold.

2. The processor as recited in claim 1, wherein the processor is configured to shut down at least one of the prediction unit and the instruction cache responsive to detecting the processor is in the loop buffer mode.

3. The processor as recited in claim 1, wherein the loop buffer control unit is further configured to determine the first loop has an unpredictable exit responsive to determining a prediction provided by the prediction unit will not change for the first loop.

4. The processor as recited in claim 3, wherein determining the prediction provided by the prediction unit will not change comprises determining the prediction unit has stored information for N taken branches that have executed over one or more iterations of the first loop, where N is an integer.

5. The processor as recited in claim 3, wherein determining the prediction provided by the prediction unit for the first loop will not change comprises detecting a given pattern in a branch history register.

6. The processor as recited in claim 1, wherein the loop buffer control unit is further configured to maintain a confidence indicator associated with the first loop, wherein the confidence indicator indicates a difference between a number of mispredictions of the exit condition for the first loop and a number of correct predictions of the exit condition.

7. The processor as recited in claim 6, wherein the loop buffer control unit is further configured to:
   decrease the confidence indicator each time the prediction unit correctly predicts the exit condition of the first loop; and
   increase the confidence indicator each time the prediction unit mispredicts the exit condition of the first loop.

8. A system comprising:
   a processor comprising an instruction cache; and
   one or more memories;
   wherein the processor is configured to:
      detect a first loop in a stream of instructions; and
      enter a loop buffer mode for the first loop responsive to determining the first loop has an unpredictable exit, wherein determining the first loop has an unpredictable exit comprises detecting a number of mispredictions of an exit condition for the first loop exceeds a threshold; and
      dispatch instructions from a loop buffer rather than the instruction cache, in response to detecting the loop buffer mode.

9. The system as recited in claim 8, wherein the processor is configured to shut down at least one of a prediction unit configured to predict a loop exit condition and a memory of the one or more memories responsive to detecting the loop buffer mode.

10. The system as recited in claim 8, wherein the processor is further configured to determine the first loop has an unpredictable exit responsive to determining a prediction provided by a prediction unit configured to predict a loop exit condition for the first loop will not change.

11. The system as recited in claim 10, wherein determining the prediction provided by the prediction unit will not change comprises determining the prediction unit has stored information for N taken branches that have executed over one or more iterations of the first loop, where N is an integer.

12. The system as recited in claim 10, wherein determining the prediction provided by the prediction unit for the first loop will not change comprises detecting a given pattern in a branch history register.

13. The system as recited in claim 8, wherein the processor is further configured to maintain a confidence indicator associated with the first loop, wherein the confidence indicator indicates a difference between a number of mispredictions of the exit condition for the first loop and a number of correct predictions of the exit condition for the first loop.

14. The system as recited in claim 13, wherein the processor is further configured to:
   decrease the confidence indicator each time the prediction unit correctly predicts the exit condition of the first loop; and
   increase the confidence indicator each time the prediction unit mispredicts the exit condition of the first loop.

15. A method comprising:
   detecting a first loop in an instruction stream;

entering a loop buffer mode for the first loop responsive to determining the first loop has an unpredictable exit, wherein determining the first loop has an unpredictable exit comprises detecting a number of mispredictions of an exit condition for the first loop exceeds a threshold; and dispatching instructions from a loop buffer rather than an instruction cache, in response to detecting the loop buffer mode.

16. The method as recited in claim 15, further comprising shutting down at least one of a prediction unit configured to predict a loop exit condition and the instruction cache responsive to detecting the processor is in the loop buffer mode.

17. The method as recited in claim 15, further comprising determining the first loop has an unpredictable exit responsive to determining a prediction provided by a prediction unit configured to predict a loop exit condition will not change for the first loop.

18. The method as recited in claim 17, wherein determining the prediction provided by the prediction unit will not change comprises determining the prediction unit has stored information for N taken branches that have executed over one or more iterations of the first loop, where N is an integer.

19. The method as recited in claim 17, wherein determining the prediction provided by the prediction unit for the first loop will not change comprises detecting a given pattern in a branch history register.

20. The method as recited in claim 15, further comprising maintaining a confidence indicator associated with the first loop, wherein the confidence indicator indicates a difference between a number of mispredictions of the exit condition for the first loop and a number of correct predictions of the exit condition for the first loop.

* * * * *